Patented Feb. 23, 1937

2,071,816

UNITED STATES PATENT OFFICE 2,071,816

MANUFACTURE OF ACID COMPOSITIONS

Tom Cummings, Brooklyn, N. Y., assignor to General Chemical Company, New York, N. Y., a corporation of New York No Drawing. Application September 13, 1933, Serial No. 689,263

3 Claims. (Cl. 23—5)

This invention relates to liquid mixtures and/or compounds of hydrofluoric acid and ammonia, and more particularly, the invention is directed to methods for making such products.

In some of the arts, for example in frosting glass, various compositions containing ingredients such as hydrofluoric acid, ammonium bifluoride and other ammonia compounds, have been employed. The products made in accordance with the processes of the invention are particularly adapted for use in similar operations.

The principal objects of the present invention lie in the provision of methods for making preferably substantially anhydrous products comprising mixtures and/or compounds of hydrofluoric acid and ammonia which mixtures and/or compounds are liquids at normal temperatures. The invention also contemplates, as one of the important objects thereof, the provision of methods which may be easily controlled to produce such liquid products having various commercially desirable ratios of hydrofluoric acid to ammonia.

It is not known whether the hydrofluoric acid-ammonia products of the invention are compounds or mixtures or combinations of both. Whatever may be the case, for convenience, the liquid substances formed by the methods of the invention are designated herein as hydrofluoric acid-ammonia compositions.

It has been found that by bringing together hydrofluoric acid and fluorides of ammonia, preferably liquid hydrofluoric acid and solid fluorides of ammonia, under conditions insuring the presence of hydrofluoric acid in excess of the amount of hydrofluoric acid required to combine with ammonia to produce ammonium bifluoride, compositions comprising hydrofluoric acid and ammonia are formed which are liquid at normal temperatures.

When hydrofluoric acid and ammonia are associated, under proper conditions, in proportions by weight of about 70 parts hydrofluoric acid and about 30 parts ammonia, that is, a weight ratio of hydrofluoric acid to ammonia of about 70 to 30 or about 2.33, ammonium bifluoride is formed which is a crystalline substance solid at normal temperatures, designated by the formula $NH_4F.HF$. For certain commercial processes, for example in frosting and etching glass, it is desirable to produce mixtures and/or compounds containing hydrofluoric acid and ammonia, preferably without water, in which the weight ratio of HF to ammonia exceeds 2.33. These mixtures have been found to be liquid at ordinary temperatures, when in substantially anhydrous form, and such anhydrous mixtures are more readily transported than corresponding anhydrous constituents which are gaseous at ordinary temperatures and must be compressed to place in the liquid state. It is to the manufacture of such products that the present invention is directed. By the processes of the invention, there may be formed numerous substantially anhydrous liquid products comprising hydrofluoric acid-ammonia compositons of varying proportions of hydrofluoric acid and ammonia.

In accordance with preferred embodiments of the invention, I have found that a liquid hydrofluoric acid-ammonia composition may be advantageously produced by incorporating a solid fluoride of ammonia and liquid hydrofluoric acid.

In practicing the methods of the invention, the ammonium fluorides used are preferably water free and may be either the so-called normal or neutral ammonium fluoride ($NH_4F$), or ammonium bifluoride ($NH_4F.HF$). Ammonium fluoride and ammonium bifluoride are crystalline substances, solid at normal temperatures, which may be substantially water free. The hydrofluoric acid used is preferably substantially anhydrous acid.

As noted, ammonium bifluoride contains hydrofluoric acid and ammonia approximately in the ratio of about 70 parts by weight of hydrofluoric acid to about 30 parts by weight of ammonia; that is, a weight ratio of about 2.33. Accordingly, in the liquid products of the present methods, the ratio of hydrofluoric acid to ammonia, in the hydrofluoric acid-ammonia compositions, is in excess of 70 to 30, or in other words, in excess of about 2.33, so that the hydrofluoric acid-ammonia compositions are in the liquid condition at normal temperatures.

The proportions of hydrofluoric acid and ammonia in the final products are controlled by the incorporation of proper amounts of ammonium fluoride or ammonium bifluoride with hydrofluoric acid. In making the preferred anhydrous compositions of hydrofluoric acid and ammonia, anhydrous raw materials are preferably utilized. In carrying out this phase of the invention, the desired quantity of solid ammonium fluoride or ammonium bifluoride, or mixtures of both, is placed in a vat or mixing vessel, and the amount of liquid anhydrous hydrofluoric acid needed to form the hydrofluoric acid-ammonia compositions having the desired hydrofluoric acid-ammonia ratio is added to the vat. The resulting mass is thoroughly mixed. The solid ammonium fluorides become associated with the liquid hydrofluoric acid, and a liquid composition of hydrofluoric acid and ammonia is obtained having the desired proportions of hydrofluoric acid and ammonia. For example, if a substantially anhydrous hydrofluoric acid-ammonia composition is desired having about 75 parts by weight of hydrofluoric acid to about 25 parts by weight of ammonia, or a hydrofluoric acid-ammonia ratio of about 3, substantially water-free solid ammonium fluoride or bifluoride is used, and the required amount of substantially anhydrous hydrofluoric acid in liquid form is added to the batch. Preferably acid is added gradually to the batch, and the mass intermittently tested, and further quantities of acid are added until the desired hydrofluoric acid-ammonia ratio is obtained. If a composition having a higher or lower hydrofluoric acid-ammonia ratio is desired a correspondingly greater or lesser amount of acid is added to the batch.

One preferred product which may readily be manufactured by the processes of the invention is a liquid anhydrous composition of hydrofluoric acid and ammonia having a hydrofluoric acid-ammonia ratio of about 6.14. This product may be made preferably by incorporating substantially water-free solid ammonium bifluoride and the amount of substantially anhydrous liquid hydrofluoric acid required to bring the hydrofluoric acid-ammonia ratio of the liquid mass formed up to about 6.14.

In any of the methods, when utilizing solid ammonium fluoride, it will be understood that a larger amount of acid is required to form a hydrofluoric acid-ammonia composition having the desired hydrofluoric acid-ammonia ratio than when employing the bifluoride, since an initial amount of acid is required to first bring the fluoride to the bifluoride state.

I claim:

1. The method of making a hydrofluoric acid-ammonia composition which comprises treating a substantially water-free solid fluoride of ammonia with substantially anhydrous liquid hydrofluoric acid, and regulating the amount of acid employed so that the resulting mass formed is liquid at normal temperatures.

2. The method of making an anhydrous liquid hydrofluoric acid-ammonia composition which comprises treating substantially water-free solid ammonium bifluoride with substantially anhydrous liquid hydrofluoric acid.

3. The method of making a liquid hydrofluoric acid-ammonia composition which comprises treating a substantially water-free solid fluoride of ammonia with substantially anhydrous liquid hydrofluoric acid, and regulating the amount of acid employed so as to form a hydrofluoric acid-ammonia composition having a hydrofluoric acid-ammonia ratio of about 6.14.

TOM CUMMINGS.